(12) United States Patent
Tjader

(10) Patent No.: US 7,448,829 B2
(45) Date of Patent: Nov. 11, 2008

(54) REPLACEMENT OF UNDERGROUND PIPES

(75) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 87 days.

(21) Appl. No.: 11/379,136

(22) Filed: Apr. 18, 2006

(65) Prior Publication Data
US 2008/0008537 A1      Jan. 10, 2008

Related U.S. Application Data

(60) Provisional application No. 60/672,267, filed on Apr. 18, 2005.

(51) Int. Cl.
*F16L 55/18* (2006.01)
(52) U.S. Cl. .................. 405/184.3; 405/156; 138/97
(58) Field of Classification Search .......... 405/156, 405/184.3; 138/97
See application file for complete search history.

(56) References Cited

U.S. PATENT DOCUMENTS

| | | | | |
|---|---|---|---|---|
| 3,181,302 | A | * | 5/1965 | Lindsay ............... 405/156 |
| 4,262,650 | A | | 4/1981 | Ferrand et al. |
| 4,903,406 | A | * | 2/1990 | Schosek et al. ......... 405/156 |
| 4,983,071 | A | * | 1/1991 | Fisk et al. ............ 405/184.3 |
| 5,076,731 | A | | 12/1991 | Luksch |
| 5,078,546 | A | | 1/1992 | Fisk et al. |
| 5,306,101 | A | * | 4/1994 | Rockower et al. ...... 405/184.3 |
| 5,689,388 | A | | 11/1997 | Oka et al. |

(Continued)

FOREIGN PATENT DOCUMENTS

DE            10357061        *   7/2005

(Continued)

OTHER PUBLICATIONS

U.S. Appl. No. 60/568,159.

(Continued)

*Primary Examiner*—Frederick L Lagman
(74) *Attorney, Agent, or Firm*—Schwegman, Lundberg & Woessner, P.A.

(57) ABSTRACT

This document discusses, among other things, devices, apparatuses, and methods for the replacement of existing underground pipes. In general, an apparatus comprises a body, including a receiving portion, and a breaking assembly adapted to be positioned within the receiving portion and detachably coupled to the body. In one example, the body and the breaking assembly are adapted, when coupled, to split the existing underground pipe when pulled therethrough using one or more cutting wheels. In varying examples, each cutting wheel radially protrudes out of a breaking assembly housing an increasing amount along a length of the apparatus allowing for a clean, progressive cut of the existing pipe. In another example, the body and the breaking assembly are adapted, when coupled, to burst the existing pipe when pulled therethrough. Advantageously, the present devices, apparatuses, and methods may provide replacement of underground pipes requiring minimal excavation and making economical use of parts.

34 Claims, 9 Drawing Sheets

U.S. PATENT DOCUMENTS

| | | | |
|---|---|---|---|
| 6,340,270 B2 * | 1/2002 | Puttmann | 405/184.3 |
| 6,585,453 B2 | 7/2003 | Robinson | |
| 6,702,521 B2 | 3/2004 | Robinson | |
| 6,793,442 B2 | 9/2004 | Carter et al. | |
| 6,799,923 B2 | 10/2004 | Carter et al. | |
| 7,172,370 B2 * | 2/2007 | Schmidt | 405/184.3 |

FOREIGN PATENT DOCUMENTS

| | | | |
|---|---|---|---|
| GB | 2408786 | * | 6/2005 |

OTHER PUBLICATIONS

"Typical Grundoburst Set-Up", http://www.tttechnologies.com/methods/hyd_stat/index.html, (2004), 2 pgs.

Davis, Gerald, "Anatomy of an abrasive cutting machine: More than the sum of its parts", http://www2.thefabricator.com/Articles/Tube_and_Pipe_Article.cfm?ID=154, (Jun. 13, 2002), 6 pgs.

Davis, Gerald, "Anatomy of an abrasive cutting machine: More than the sum of its parts", http://www2.thefabricator.com/Articles/Tube_and_Pipe_Article.cfm?ID=154, (Jun. 13, 2002), 6 pgs.

* cited by examiner

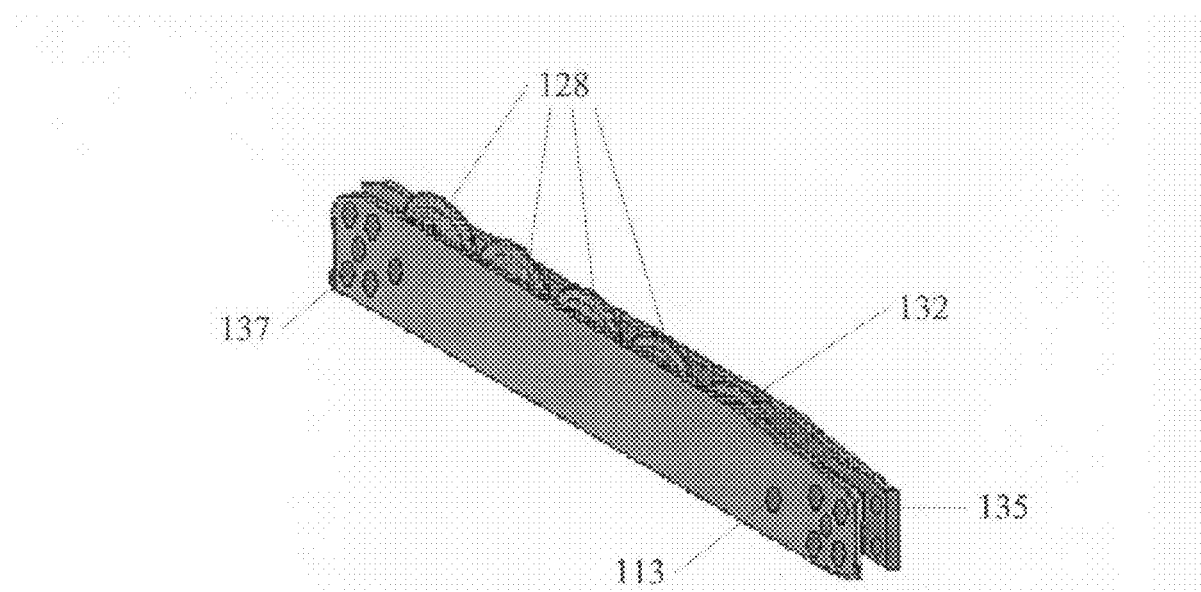
*FIG. 4A*
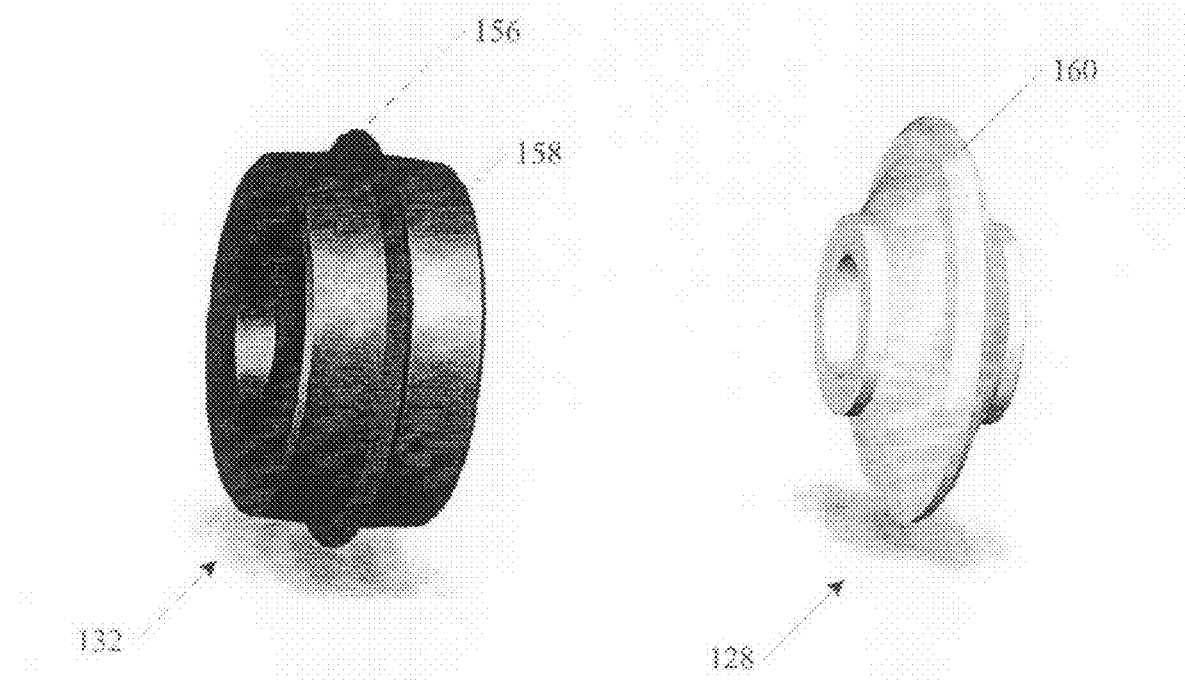
*FIG. 4B*          *FIG. 4C*

REPLACEMENT OF UNDERGROUND PIPES

CROSS REFERENCE

This patent application claims the benefit of priority, under 35 U.S.C. Section 119(e), to U.S. Provisional Patent Application Ser. No. 60/672,267, filed on Apr. 18, 2005, which is incorporated herein by reference.

TECHNICAL FIELD

This patent document pertains generally to devices, apparatuses, and methods for pipe replacement, and more particularly, but not by way of limitation, to devices, apparatuses, and methods for the replacement of underground pipes.

BACKGROUND

Underground pipes are used for, among other things, connecting homes and creating networks for utilities such as sewer, water, gas, electric, telephone, etc. As underground pipes age, they are subject to inevitable deterioration and wear. As a result, underground pipes need to be replaced from time-to-time.

One method for replacing existing underground pipe with replacement pipe is to excavate the entire length of the existing pipe, remove it and place new replacement pipe into the excavation. Drawbacks of such "excavation" method of replacing existing underground pipe are numerous. For example, excavation of existing pipe can be expensive, time-consuming, labor-intensive, and may result in damage to the area surrounding the excavation. In many instances, a main portion of underground pipes lie beneath driveways, buildings, lawns, or gardens, and property owners are often concerned about any damage that may result thereto. In addition, excavation is often made difficult by the presence of other underground utilities.

A technique known as "pipe bursting" may be one way to replace underground pipe without the need to dig up the pipe to be replaced. In pipe bursting, an expander, which is also sometimes referred to as a "mole," is pulled by a cable, chain, or other similar means through the existing pipe while it is still underground. The body of the expander is typically slightly larger than an inner diameter of the existing pipe. As the expander is pulled, it is designed to break or "burst" the existing underground pipe into many remnants, and at the same time expand the remnants into the surrounding soil. The expansion of the old pipe allows the expander to pull a replacement pipe into place.

A technique known as "pipe splitting" may be another way to replace underground pipe without the need to dig up the pipe to be replaced. In pipe splitting, a pipe splitter is pulled by a cable through the existing pipe while it is still underground. A first portion of the pipe splitter is typically slightly smaller in diameter than the inner diameter of the pipe to be replaced. As the pipe splitter is pulled, it is designed to split the existing pipe, and at the same time expand the split pipe into the surrounding soil. The expansion of the split pipe allows the pipe splitter to simultaneously pull a replacement pipe into place.

BRIEF DESCRIPTION OF THE DRAWINGS

In the drawings, which are not necessarily drawn to scale, like numerals describe similar components throughout the several views. The drawings illustrate generally, by way of example, but not by way of limitation, various embodiments discussed in the present document.

FIG. 4A is an isometric view illustrating an assembly of one embodiment of the present apparatus.

FIG. 4B is an isometric view illustrating one element of the assembly of FIG. 4A.

FIG. 4C is an isometric view illustrating another element of the assembly of FIG. 4A.

DETAILED DESCRIPTION

The following detailed description includes references to the accompanying drawings, which form a part of this detailed description. The drawings show, by way of illustration, specific embodiments in which the present devices, apparatuses, and methods may be practiced. These embodiments, which are also referred to herein as "examples," are described in enough detail to enable those skilled in the art to practice the present devices, apparatuses, and methods. The embodiments may be combined, other embodiments may be utilized, or structural or logical changes may be made without departing from the scope of the present devices, apparatuses, and methods. It is also to be understood that the various embodiments of the present devices, apparatuses, and methods, although different, are not necessarily mutually exclusive. For example, a particular feature, structure or characteristic described in one embodiment may be included within other embodiments. The following detailed description is, therefore, not to be taken in a limiting sense, and the scope of the present devices, apparatuses, and methods are defined by the appended claims and their legal equivalents.

In this document: the terms "a" or "an" are used to include one or more than one; the term "or" is used to refer to a nonexclusive or, unless otherwise indicated; and the term "cable" is used to include metal cables, wire rope, or other lengths of material of suitable strength to pull the present devices or apparatuses through a section of existing underground pipe or execute the present methods as described below and as defined by the appended claims.

INTRODUCTION

The following Detailed Description will discuss devices, apparatuses, and methods that provide replacement of underground pipe without the need for (extensive) excavation. Although the embodiments discussed herein refer (in large part) to pipe splitting devices; pipe bursting devices utilizing similar concepts (e.g., a detachable breaking assembly, a plurality of body sizes, and progressively increasing breaking assembly elements along a longitudinal length of a breaking assembly housing) are also contemplated.

Advantageously, the present devices, apparatuses, and methods in one embodiment provide a pipe splitter allowing for a clean, predicable cut of an existing underground pipe and an increase in the speed and decrease in the power needed to pull the pipe splitter therethrough. Further, the present devices, apparatuses, and methods provide a pipe splitter having an economically favorable (interchangeable) design.

EXAMPLES

Figure 1:
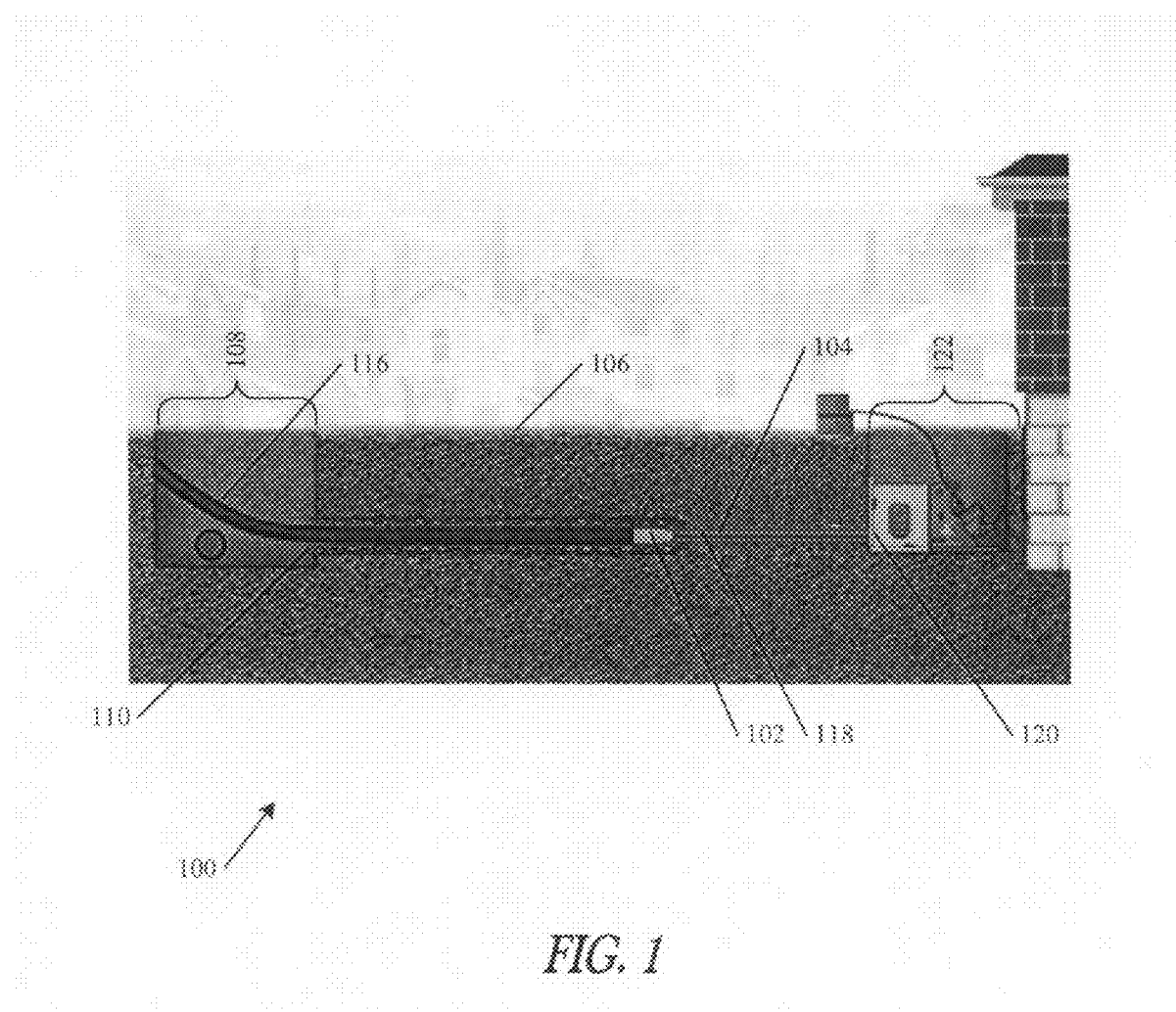
FIG. 1 is a side view of one embodiment of the present apparatus in a trenchless pipe replacement operation.
Figure 2A:
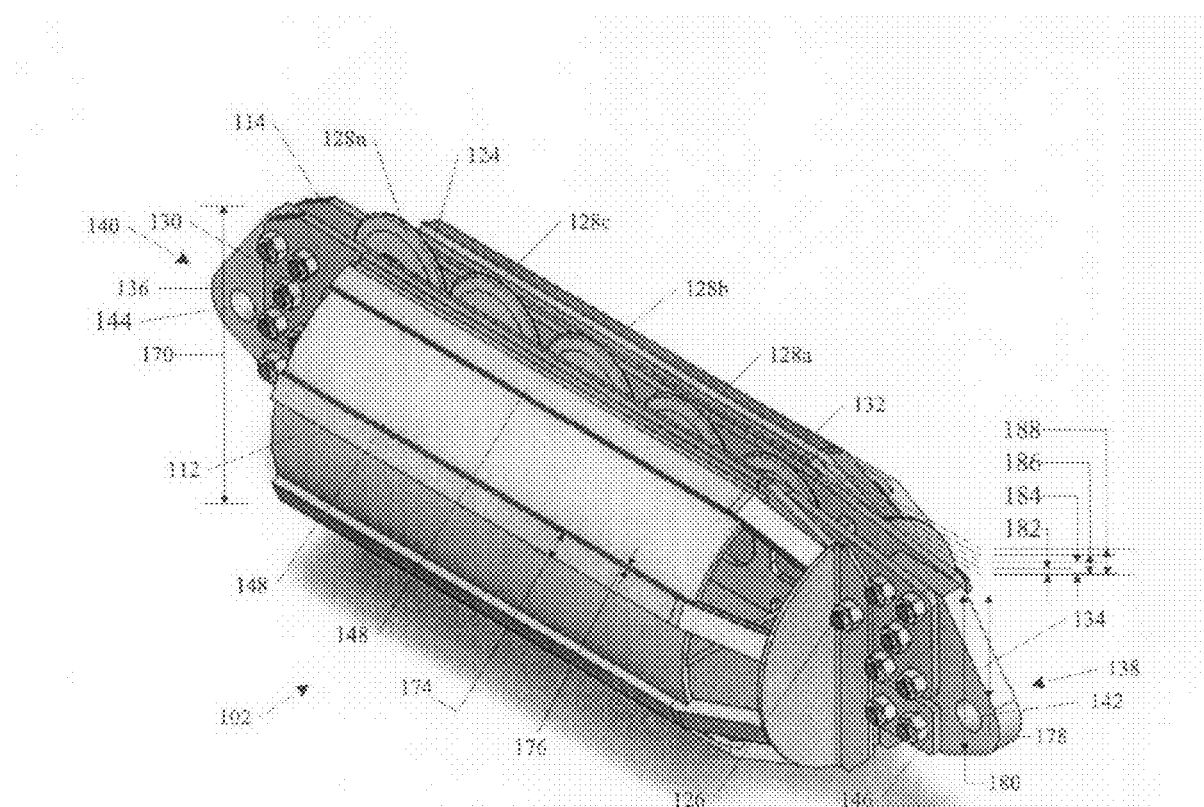
FIG. 2A is an isometric view illustrating one embodiment of the present apparatus.
Figure 2B:
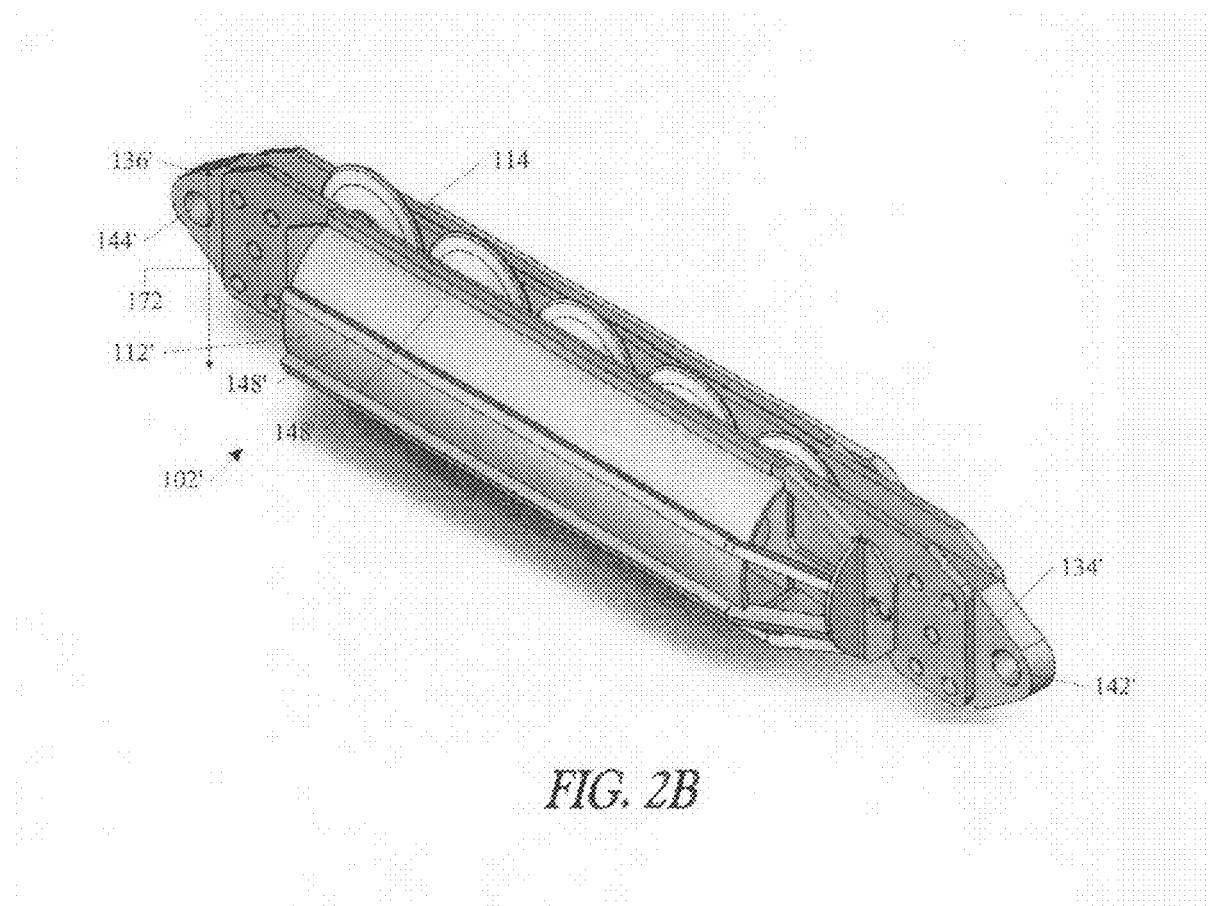
FIG. 2B is an isometric view illustrating another embodiment of the present apparatus.

FIG. 1 is a side view illustrating utilization of one embodiment of an apparatus 102 in a trenchless pipe replacement operation 100. As depicted in FIG. 1, an existing pipe 104 that is being replaced is disposed beneath the ground level surface 106. A first hole 108 may be been dug to reveal a first end 110 of existing pipe 104 and a second hole 122 may be dug to reveal a second end 120 of existing pipe 104. Apparatus 102 may be inserted within the first end 110 of existing pipe 104. Apparatus 102 generally includes a body 112 (FIGS. 2A-2B) and a breaking assembly 114 (FIGS. 2A-2B). A description of apparatus 102 is presented in greater detail below. A length of replacement pipe 116 is removably engaged to a trailing end of apparatus 102.

A cable 118 is passed through the pipe 104 and attached with a leading end of apparatus 102. In one example, cable 118 is attached to the leading end of apparatus 102 via a pinned arrangement. In another example, cable 118 is attached to the leading end of apparatus 102 via a hooked arrangement. Other connections between cable 118 and the leading end of apparatus 102 may also be used and are within the scope of the present devices, apparatuses, and methods. Cable 118 may be utilized to pull apparatus 102 through existing pipe 104, breaking and enlarging the pipe 104 as it is pulled therethrough. In one example, breaking pipe 104 includes splitting the pipe 104 along substantially one line of cut. In another example, breaking pipe 104 includes bursting the pipe 104 into many pieces. Replacement pipe 116 may be simultaneously pulled behind apparatus 102, such that when apparatus 102 has been pulled entirely through existing pipe 104, replacement pipe 116 will reside within the split or broken pipe 104 to functionally replace it.

Advantageously, the trenchless replacement operation 100 may be easy to set up and operate (e.g., dig holes at each end of existing pipe 104, attach cable to appropriately-sized apparatus 102 (including body 112 and breaking assembly 114), attach replacement pipe to apparatus 102, and pull apparatus 102 through pipe 104). As a result, minimal crews may break and replace substantial lengths and various types of existing pipe 104 in a short amount of time. In one example, apparatus 102 replaces pipes 104 made of metal (including corrugated structures) or polymers. Moreover, because the operation is essentially trenchless (e.g., no need to excavate along the entire length of pipe 104 to be replaced), considerable lengths of trench work and costly restoration are avoided.

FIGS. 2A-2B are isometric views illustrating two embodiments of apparatus 102. As discussed above, apparatus 102 may be used for the trenchless replacement of an existing underground pipe 104. In both illustrative embodiments, apparatus 102 includes a body 112 and a breaking assembly 114. In varying examples, body 112 includes a receiving portion 124, such as a longitudinally-extending receiving portion. The breaking assembly 114 may be positioned within the receiving portion 124 and coupled to body 112. In one example, breaking assembly 114 is detachably coupled to body 112, such as by bolt and nut 126. Other attachment means between breaking assembly 114 and body 112 may be used without departing from the scope of the present devices, apparatuses, and methods. When coupled, body 112 and breaking assembly 114 are adapted to break existing underground pipe 104 when pulled therethrough.

It is often important in many trenchless pipe replacement operations 100 for body 112 to be substantially similar in size to an inner diameter of existing pipe 104 (notably, a similar size between body 112 and the inner diameter of existing pipe 104 may ensure that breaking assembly 114 has adequate supporting force to produce a break). It follows then, for different sized existing pipes 104, different sized apparatuses 102 may be needed. Advantageously, body 112 and breaking assembly 114 are adapted to be detachably coupled. As a result, breaking assembly 114 may be used interchangeably with different sized bodies 112 to form apparatus 102. One advantage of such an arrangement is that rather than having to purchase many different sized apparatuses 102 (e.g., non-detachable body 112, breaking assembly 114 combinations), a purchaser may purchase a single breaking assembly 114 and a plurality of different sized bodies 112, which are cheaper to manufacture (and thus purchase) than whole combinations (e.g., breaking assembly 114 and body 112). As shown, breaking assembly 114, which is coupled to body 112 in the illustrative FIG. 2A, may also be coupled to smaller (diameter) body 112' of FIG. 2B.

In some examples of FIG. 2A, body 112 and breaking assembly 114 are adapted, when coupled, to split existing pipe 104 when pulled therethrough using, at least in part, one or more cutting wheels $128a$, $128b$, $128c$, ..., $128n$. In this example, apparatus 102, specifically breaking assembly 114, includes four cutting wheels; however, the present devices, apparatuses, and methods are not so limited. In other examples, breaking assembly 114 includes five or more cutting wheels. Still, in other examples, breaking assembly 114 includes fewer than four cutting wheels.

In varying examples, each of the one or more cutting wheels $128a$, $128b$, $128c$, ..., $128n$ are adapted to rotate relative to the breaking assembly housing 130. In one example, each cutting wheel $128a$, $128b$, $128c$, ..., $128n$ communicates with a bearing, which may be located within the wheel itself (FIG. 5B). Other configurations allowing each cutting wheel $128a$, $128b$, $128c$, ..., $128n$ to rotate relative to the breaking assembly housing 130 may also be used without departing from the scope of the present devices, apparatuses, and methods.

In some examples, each of the one or more cutting wheels $128a$, $128b$, $128c$, ..., $128n$ includes a sharp cutting edge without any support portion or shoulder (e.g., portion to limit an aggressiveness of the split made by the cutting wheel, see FIG. 4C). In some examples, a size (e.g., diameter) of each cutting wheel $128a$, $128b$, $128c$, ..., $128n$ increases or stays the same along a longitudinal length of apparatus 102. In this example, cutting wheels $128a$, $128b$, $128c$, ..., $128n$ are equally sized and as a result of being eccentrically mounted (FIGS. 5A-5B), radially protrude out of breaking assembly housing 130 an increasing amount (184, 186, 188) along the longitudinal length of apparatus 102.

In some examples, breaking assembly 114 includes at least one scoring wheel 132 (FIG. 4B). In this example, one scoring wheel 132 is positioned to groove an inner surface of existing pipe 104 in advance of cutting wheels $128a$, $128b$, 128c, . . . , 128n. In one example, scoring wheel 132 includes a sharp cutting edge and a support portion. In one method of operation, the scoring wheel 132 functions to begin a split in the inner surface of existing pipe 104, without being too aggressive (e.g., limited by the support portion) about the split in the first wheel. In this example, scoring wheel 132 radially protrudes out of breaking assembly housing 130 less than cutting wheels 128a, 128b, 128c, . . . , 128n (182). In other examples, breaking assembly 114 includes multiple scoring wheels 132. In some examples, breaking assembly 114 includes another cutting wheel 128, as described above, in the place of scoring wheel 132. In varying examples, a diameter or mounting of each wheel (e.g., cutting wheel 128 or scoring wheel 132), and the presence or absence of a support portion, as in scoring wheel 132, determine an amount of splitting that each wheel performs.

By selecting a combination of wheels, including scoring wheel(s) 132 and cutting wheel(s) 128, and various diameters or mountings of such wheels, a progressive splitting operation may be performed resulting in a lower and more consistent pulling force requirement to advance apparatus 102 through existing underground pipe 104. Other elements, such as fins, expanders, etc. are further added to the apparatus 102 in other embodiments.

As shown in FIG. 2A, apparatus 102 further includes a leading pulling device 134. In some examples, leading pulling device 134 is coupled to a first end 138 of one or both of: body 112 and breaking assembly housing 130. In this example, leading pulling device 134 is detachably coupled to a first end 138 of breaking assembly housing 130. As shown in this example, leading pulling device 134 includes a generally tapered nose portion having bore 142 formed therethrough for releasably engaging cable 118, which is adapted to pull apparatus 102 through existing pipe 104.

Apparatus 102 may also include a trailing pulling device 136. In some examples, trailing pulling device 136 is coupled to a second end 140 of one or both of: body 112 and breaking assembly housing 130. In this example, trailing pulling device 136 is detachably coupled to a second end 140 of breaking assembly housing 130. As shown in this example, trailing pulling device 136 includes a generally tapered nose portion having a bore 144 formed therethrough for releasably attaching to replacement pipe 116 to simultaneously pull replacement pipe 116 into place as apparatus 102 is pulled through existing underground pipe 104 by cable 118.

In some examples, a size and a shape of leading pulling device 134 and trailing pulling device 136 and a location of bores 142, 144 relate to a size of body 112, such that apparatus 102 is pulled through existing underground pipe 104 from an apparatus center (e.g., geometric center). As discussed above, body 112' shown in FIG. 2B is smaller in diameter 172 than body 112 shown in FIG. 2A having diameter 170. Thus, in the illustrative examples of FIGS. 2A-2B, leading pulling device 134 of FIG. 2A differs in size and shape from leading pulling device 134' of FIG. 2B. Similarly, trailing pulling device 136 of FIG. 2A differs in size and shape from trailing pulling device 136' of FIG. 2B. Moreover, the location of bores 142, 144 shown in FIG. 2A differ from the location of bores 142', 144' shown in FIG. 2B.

In some examples, such as in FIG. 2A, a cross bar 146 is coupled to leading pulling device 134 on a cross bar first end 138 and is coupled to trailing pulling device 136 on a cross bar second end 140, such as for larger pulling device 134, 136 sizes. In one example, cross bar 146 may be used to provide additional support to pulling devices (e.g., 134, 136) having a height 180 which is greater than a height 178 of breaking assembly housing 130. Cross bar 146 may also play a role in ensuring apparatus 102 is pulled through existing underground pipe 104 from its geometric center.

In varying examples, apparatus 102 includes at least one skid structure 148 coupled to an outer surface of body 112. In the illustrative example of FIG. 2A, a plurality of skid structures 148 are coupled to the outer surface of body 112. Skid structures 148 may be used to contact an inner surface of existing underground pipe 104 and advantageously are inexpensive to manufacture. In some examples, skid structures 148 are formed from a material that provides a low coefficient of friction with existing pipe 104. Coefficient of friction, which is also sometimes referred to as "frictional coefficient," or simply as "friction coefficient," is a scalar value used to calculate a force of friction between two bodies. It is usually between 0 and 1. The coefficient of friction depends on the materials used. A low coefficient of friction indicates that materials rub together easily. Advantageously, skid structures 148 may be composed of a material having a low coefficient of friction with a material of existing pipe 104 to be split or burst, requiring less effort (e.g., a lower pulling force requirement) to move apparatus 102 through existing pipe 104. In some examples, skid structures 148 are formed from a material having a hardness greater than a hardness of the material used in existing pipe 104. Advantageously, when skid structures 148 possess a greater hardness than existing pipe 104, wear and deformation may be minimized as apparatus 102 is pulled through pipe 104.

A size (e.g., a width 174 or depth 176) of skid structures 148 may vary. In one example, skid structures 148 of FIG. 2A have a larger width 174 and smaller depth 176 than the skid structures 148' of FIG. 2B. In another example, a depth 176 of skid structures 148 gradually increases along a longitudinal length of body 112. The increase in depth 146 of skid structures 148 may maintain constant localized pipe tension within the pipe 104 in the vicinity of the location of the break (e.g., split or burst) as apparatus 102 is pulled therethrough. For example, as pipe 104 is progressively split, the circumferential integrity of the existing pipe decreases. By increasing the effective size (e.g., diameter) of apparatus 102 along a longitudinal length, added tightness between apparatus 102 and existing pipe 104 is imported such that cutting wheels 128a, 128b, 128c, . . . , 128n may more easily perform their splitting function.

Figure 3:
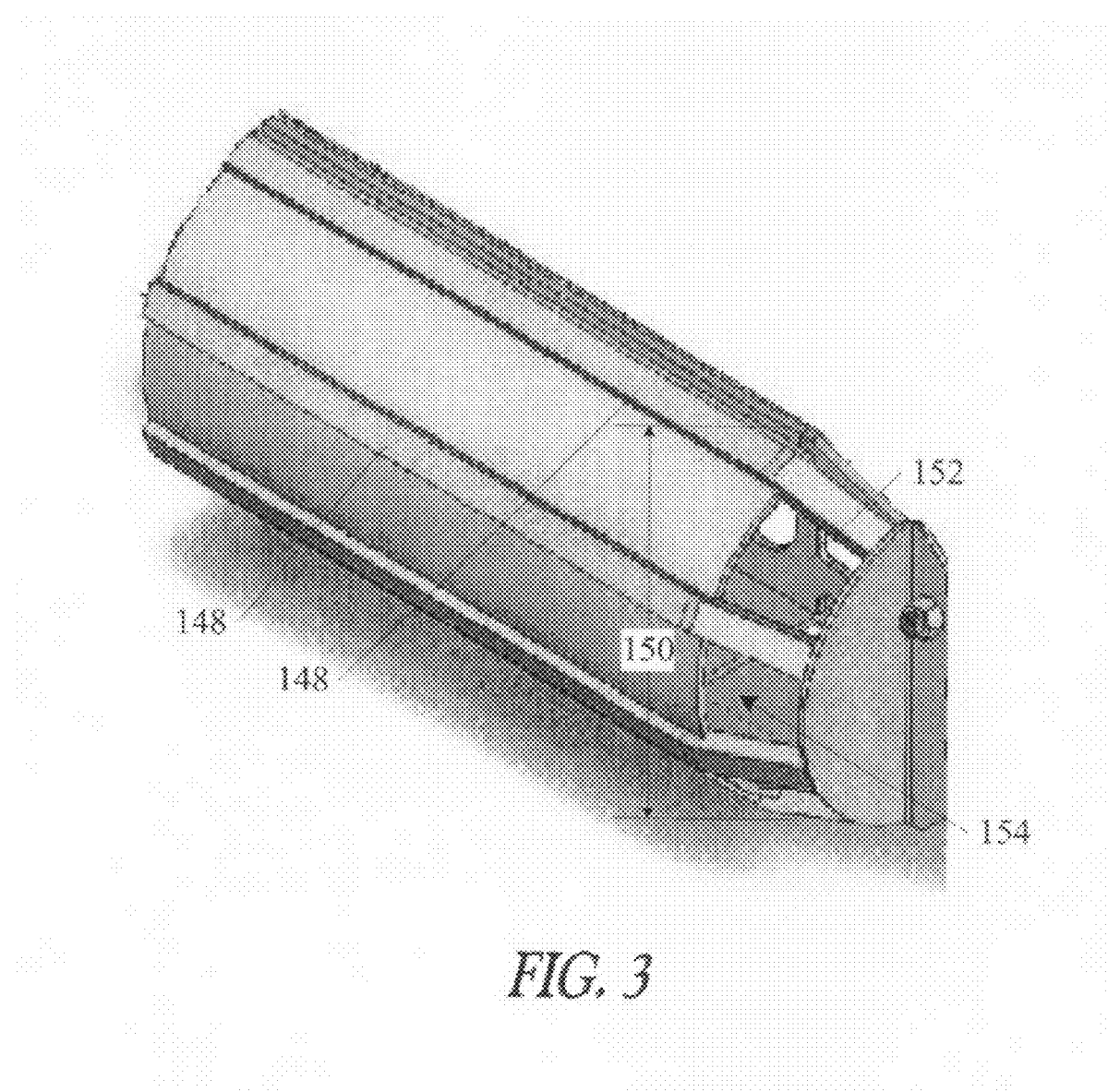
FIG. 3 is an isometric view illustrating a device of one embodiment of the present apparatus.

FIG. 3 is an isometric view illustrating a portion of body 112 (of apparatus 102). As discussed above, body 112 may advantageously be coupled in a detachable manner to breaking assembly 114. In this way, a single breaking assembly 114 may be attached to a plurality of different sized bodies 112. In one example, a size of body 112 is indicated by a diameter 150 of the body 112. Coupled to an outer surface of the portion of body 112 are a plurality of skid structures 148. In some examples, as is shown in FIG. 3, body 112 includes a shell structure having at least one internal support member 152. The shell structure may be formed by a cylindrical portion 154 within body 112. Advantageously, the shell structure reduces weight associated with apparatus 102 and reduces material costs associated with manufacturing apparatus 102. Internal support member 152 provides the shell structure with integrity which is needed as apparatus 102 is pulled through existing underground pipe 104.

FIG. 4A is an isometric view illustrating breaking assembly 114. In this example, breaking assembly 114 is shown detached from body 112 and includes a plurality of openings for use in attachment to body 112 (e.g., hole 113) and for attachment to leading and trailing pulling devices 134 (e.g., holes 135) and 136 (e.g., holes 137), respectively. In this example, a bolt may be inserted through holes 113, 135, and 137 on a first side of breaking assembly 114 and tightened on a second side of breaking assembly 114. In this example, breaking assembly 114 includes four cutting wheels 128a, 128b, 128c, ..., 128n and one scoring wheel 132 to split existing underground pipe 104; however, the present devices, apparatuses, and methods are not so limited. As discussed above, the number, size, or position (e.g., height of wheels protruding out of cutting assembly housing 130) of each cutting wheel 128 and scoring wheel 132 may vary. In one example, the number, size, or position of cutting wheels 128 and scoring wheels 132 may depend on a composition material of pipe 104 to be split or the available pulling force to pull apparatus 102 through pipe 104. In another examples, at least one scoring wheel 132 and one or more cutting wheels 128a, 128b, 128c, ..., 128n (increasing in protruding height along a longitudinal length of apparatus 102) progressively split pipe 104. Progressive splitting may advantageously provide a more predictable split with less tearing of existing underground pipe 104. With a predictable split, a constant or near-constant pulling force requirement may be calculated and provided for (e.g., equipment, equipment settings). A constant pulling force may advantageously lessen the need for excess pulling force capabilities at a work site.

FIGS. 4B and 4C provide respective examples of a scoring wheel's 132 and a cutting wheel's 128 isometric profile. The illustrative scoring wheel 132 of FIG. 4B includes a sharp cutting edge 156 and a support portion 158. In one method of operation, the scoring wheel 132 functions to begin to split (e.g., groove) an inner surface of existing pipe 104 via cutting edge 156, without being too aggressive (limited by support portion 158). In one example, a plurality of cutting wheels 128a, 128b, 128c, ..., 128n successively follow and deepen the groove produced by scoring wheel 132. The illustrative cutting wheel 128 of FIG. 4C includes sharp cutting edge 160 without any support portion or shoulder to limit an aggressiveness of split made by cutting wheel 128.

A number of options exists for each scoring 132 and cutting 128 wheel. In one example, each scoring 132 and cutting 128 wheel is formed of a hardened steel. In some examples, each scoring 132 and cutting 128 wheel are removably engagable with breaking assembly housing 130, such that they may easily be replaced when it is necessary to do so (e.g., due to dulling) without having to purchase a new breaking assembly 114.

Figure 4D:
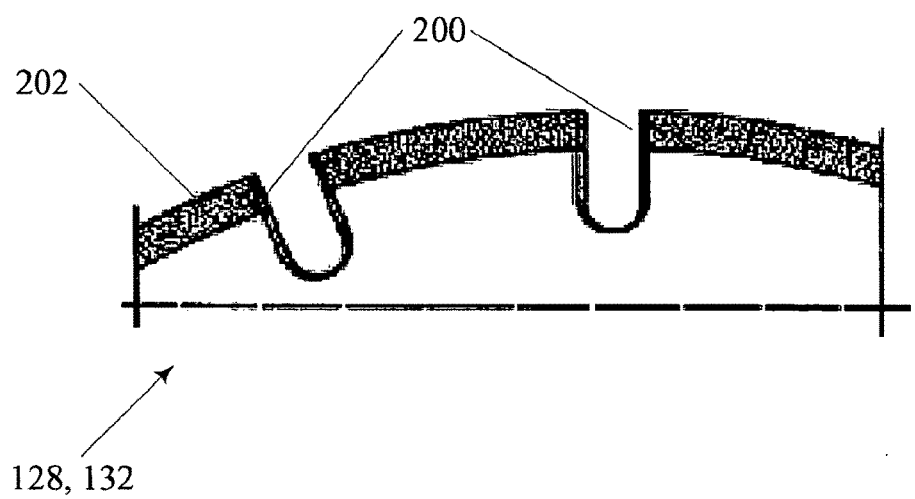
FIG. 4D is a side view illustrating an option for an element of the assembly of FIG. 4A.
Figure 4E:
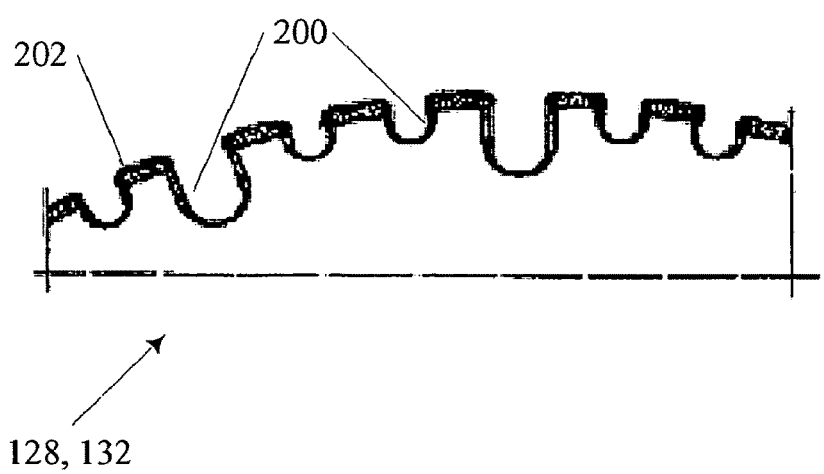
FIG. 4E is a side view illustrating another option for an element of the assembly of FIG. 4A.

FIGS. 4D and 4E provide two exemplary side profiles of the periphery of one or more scoring 132 or cutting 128 wheels. In one example, at least one of the one or more cutting wheels 128a, 128b, 128c, ..., 128n may include one or more notches 200 at its periphery. In another example, at least one scoring wheel 132 includes one or more notches 200 at its periphery. Advantageously, the notches 200 may provide for greater wheel (e.g., scoring wheel 132, cutting wheel 128) rotation as apparatus 102 is pulled through existing underground pipe 104 and may accordingly lower friction between the wheels 132, 128 and existing underground pipe 104 as the pipe 104 is split. Further, the notches 200 may provide increased cutting ability of existing underground pipe 104. Moreover, use of notches 200 may reduce tearing of pipe 104 which may occur if the cutting or scoring wheels become jammed with the pipe 104 as apparatus 102 is pulled therethrough. In one example, lower friction provided by designs disclosed herein provide the ability to split corrugated steel pipe that previously was not splittable by trenchless methods. Other sizes, shapes, and configurations of notches 200 at the periphery of cutting wheels 128a, 128b, 128c, ..., 128n or scoring wheel 132 are also within the scope of the present devices, apparatuses, and methods. In the example of FIG. 4D, the notches 200 made in the periphery of the cutting wheels 128a, 128b, 128c, ..., 128n or scoring wheel 132 are similar size and shape. In the example of FIG. 4E, the notches 200 made in the periphery of cutting wheels 128a, 128b, 128c, ..., 128n or scoring wheel, instead of all being the same size, are of two different sizes.

Figure 5A:
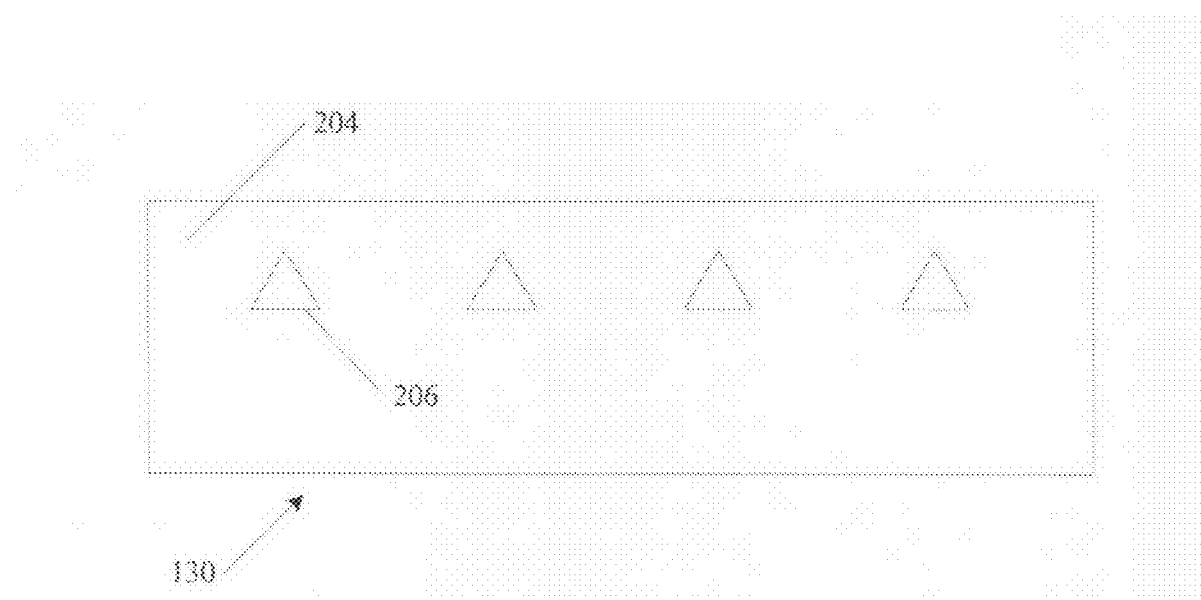
FIG. 5A is a side view illustrating one portion of a mounting system of an assembly according to one embodiment of the present apparatus.
Figure 5B:
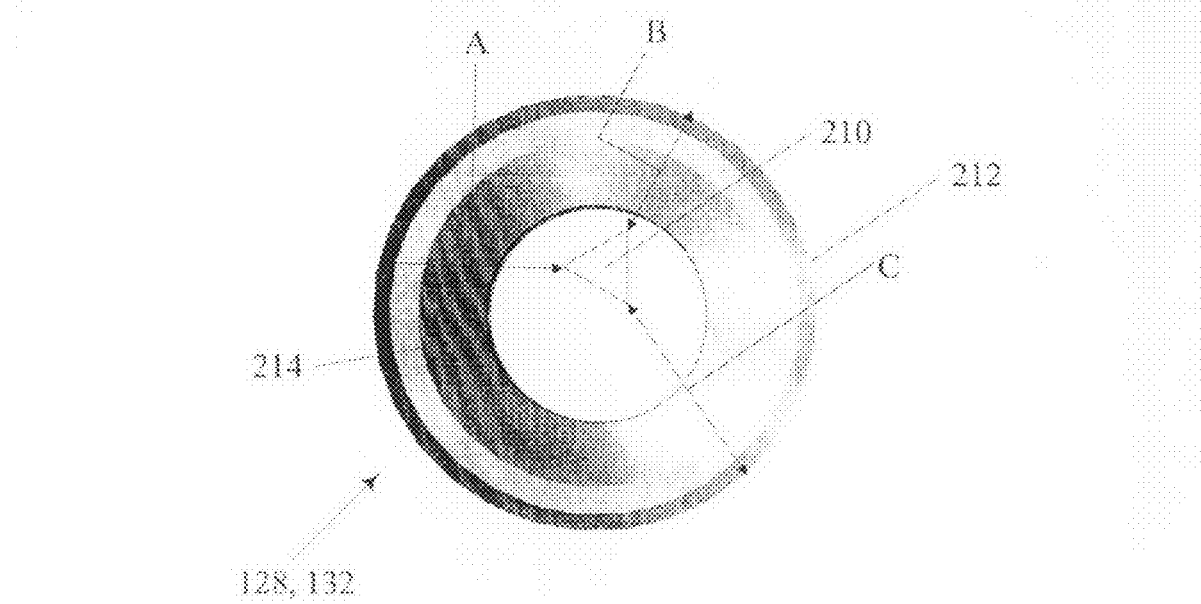
FIG. 5B is a side view illustrating another portion of a mounting system of an assembly according to one embodiment of the present apparatus.

FIGS. 5A-5B illustrate portions of a mounting system to mount cutting wheels 128a, 128b, 128c, ..., 128n or scoring wheel 132 to the breaking assembly housing 130. FIG. 5A provides one example of a inner facing side 204 of breaking assembly housing 130. As shown, inner facing side 204 includes a plurality of geometric mounting protrusions 206, such as triangles, which protrude outward from the inner facing side 204. In this example, four geometric mounting protrusions 206 are shown; however, the present devices, apparatuses, and methods are not so limited. In one example, less than four geometric mounting protrusions 206 are included. In another example, more than four geometric mounting protrusions 206 are included. To each geometric mounting protrusion 206, a cutting 128 or scoring 132 wheel may be eccentrically mounted.

FIG. 5B provides one example of a cutting wheel 128 or scoring wheel 132 that is configured to eccentrically mount to breaking assembly housing 130 via geometric mounting protrusion 206. In this example, each cutting wheel 128 or scoring wheel 132 includes a geometrically shaped cavity 210 identical in shape and size with the geometric mounting protrusion 206. Therefore, the geometric cavity 210 of each cutting 128 or scoring 132 wheel may be matably coupled with each geometric mounting protrusion 206. Although the above discusses an embodiment where inner facing side 204 includes protrusions 206 and each cutting 128 and scoring 132 wheel includes cavity 210, the present devices, apparatuses, and methods are not so limited. In another example, inner facing side 104 includes cavities and each cutting 128 and scoring 132 wheel includes a protrusion.

As shown in FIG. 5B, the geometrically shaped cavity includes edges (e.g., apexes) located at various distances from wheel edge 212. In this example, the apexes of cavity 210 are distanced from wheel edge 212 by distances A, B, and C. In this example, distance A is greater than distance B, and distance B is greater than distance C. Due to the fact that cavity 210 apex's are located at various distances from wheel edge 212, mounting orientation of the wheels 128, 132 to the protrusions 206 will determine an amount that each cutting wheel 128 or scoring wheel 132 radially protrudes out of breaking assembly housing 130. As an example, if greatest distanced (from wheel edge 212) apex (apex associated with distance A) of wheel 128 or 132 is mated to the top apex of geometric protrusion 206, such wheel's periphery will extend out of the breaking assembly housing more than if lesser distanced (from wheel edge 212) apex (apex associated with distance B) of wheel 128 or 132 were mated with the top apex of protrusion 206. Similarly, if least distanced (from wheel edge 212) apex (apex associated with distance C) of wheel 128 or 132 is mated with the top apex of geometric protrusion 206, such wheel's periphery will extend out of the breaking assembly housing less than if the apex associated with distance A or B were mated with the top apex of protrusion 206. By sequentially using the cavity apex associated with distance C, the cavity apex associated with distance B, and the cavity apex associated with distance A, breaking assembly 114 may be configured such that each cutting 128 or scoring wheel 132 protrudes out of the breaking assembly housing 130 an increasing amount along a longitudinal length of breaking assembly housing 130.

In one example, each wheel 128 or 132 includes a bearing 214 allowing the wheel to rotate relative to the breaking assembly housing 130 as apparatus 102 is pulled through existing underground pipe 104. Other eccentric design configurations allowing each cutting wheel 128a, 128b, 128c, ..., 128n or scoring wheel 132 to rotate relative to breaking assembly housing 130 and progressively increase in height may also be used without departing from the scope of the present subject devices, apparatuses, and methods.

Figure 6:
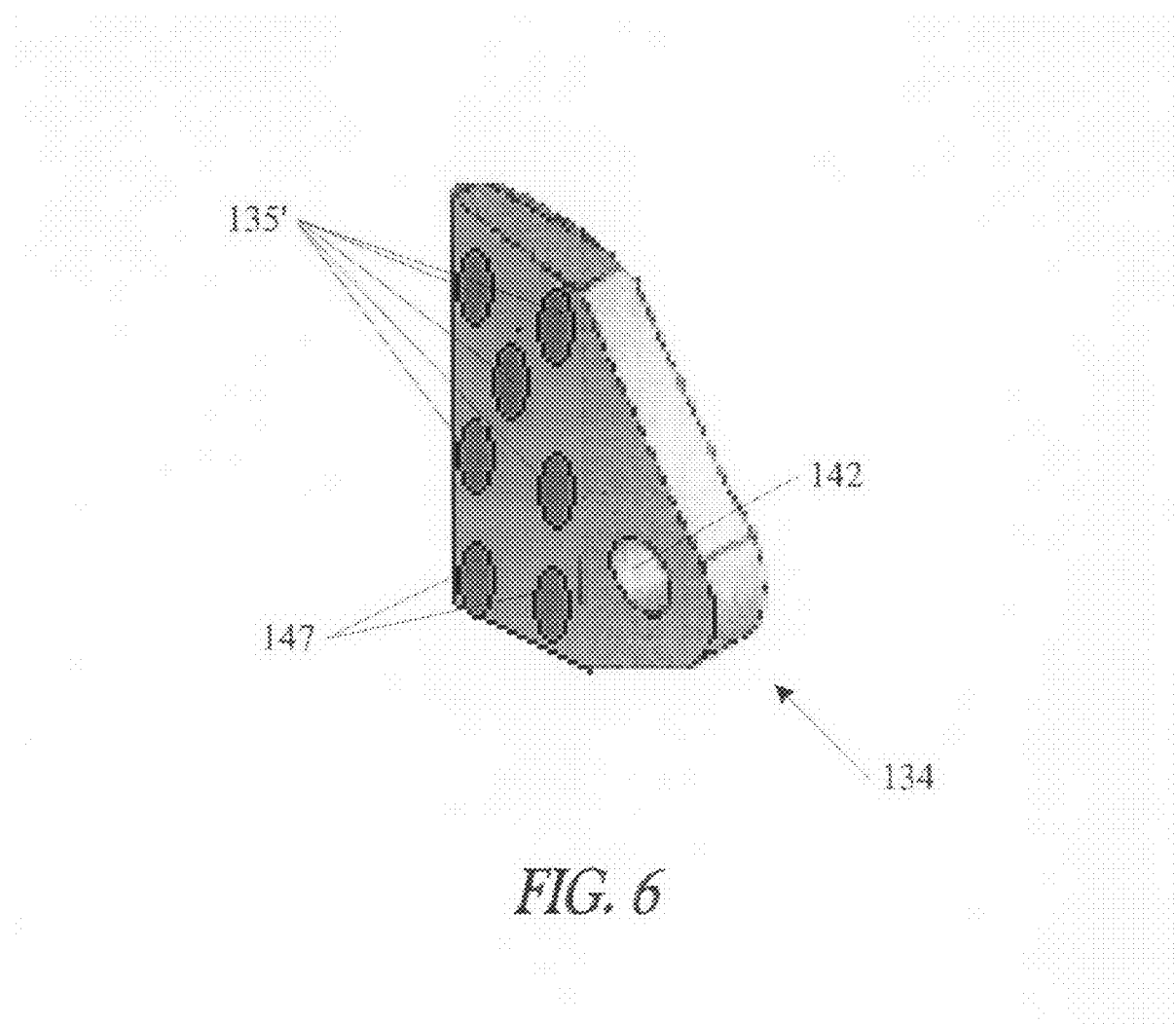
FIG. 6 is an isometric view illustrating another device of one embodiment of the present apparatus.

FIG. 6 is an isometric view illustrating a leading pulling device 134 detachably couplable to apparatus 102. In one example, leading pulling device 134 may be coupled to breaking assembly 114 via holes 135'. In this example, holes 135' of leading pulling device align with holes 135 of breaking assembly 114, specifically breaking assembly housing 130, and are secured by a plurality of bolts and nuts. In some examples, leading pulling device 134 includes a generally tapered nose portion having bore 142 formed therethrough for releasably engaging a cable 118, which is adapted to pull apparatus 102 through existing underground pipe 104. In this example, leading pulling device 134 further includes holes 147 to attach a cross bar 146 as described in greater detail above. In varying examples, leading pulling device is sized and shaped (e.g., the larger the existing pipe, the larger the leading pulling device) to pull apparatus 102 from an apparatus center. The apparatus center may be the geometric center of apparatus 102. Advantageously, pulling from the apparatus center allows apparatus 102 to proceed in a straight course through existing underground pipe 104.

Figure 7:
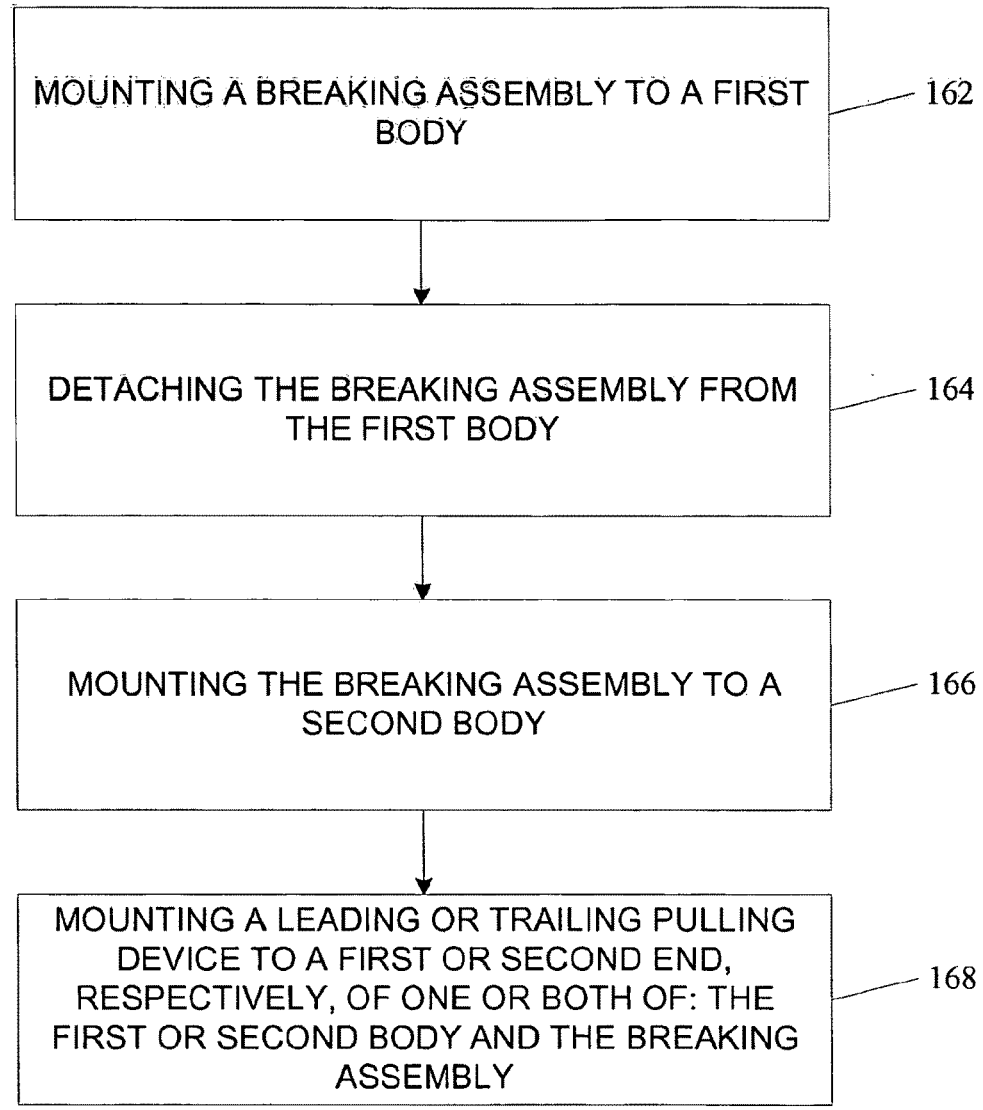
FIG. 7 is a flow chart illustrating a method of replacing existing underground pipes of various sizes according to one example of the present method.

FIG. 7 is a flow chart illustrating one method of replacing existing underground pipes of various sizes requiring minimal excavation. At 162, a breaking assembly is mounted (e.g., detachably coupled) to a first body. This may be accomplished in a number of ways. In one example, the breaking assembly is detachably coupled to the first body using bolts and nuts. In another example, the breaking assembly is detachably coupled to the first body using bolts and cotter pins.

At 164, the breaking assembly is detached from the first body. This may be accomplished in a number of ways. In one example, the breaking assembly is detached from the first body by removing one or more nuts connected to one or more bolts. In another example, the breaking assembly is detached from the first body by removing one or more cotter pins associated with one or more bolts.

At 166, the breaking assembly is mounted (e.g., detachably coupled) to a second body. In various examples, a diameter associated with the second body differs from a diameter associated with the first body (notably, a diameter of the body typically relates to an inner diameter of the underground pipe to be replaced, as discussed in greater detail above); however, the mounting of the breaking assembly to the second body may still be accomplished in ways similar to the ways used in mounting the breaking assembly to the first body. For instance, in one example, the breaking assembly is detachably coupled to the second body using bolts and nuts. In another example, the breaking assembly is detachably coupled to the second body using bolts and cotter pins.

Various options for the methods shown in FIG. 7 are possible. For instance, in one example, the breaking assembly includes one or more cutting wheels or scoring wheels rotatably coupled to a breaking assembly housing to split an existing underground pipe. In another example, each cutting or scoring wheel is adapted to eccentrically mount to the breaking assembly housing at one or more positions. In another example, at least one of the one or more cutting wheels or scoring wheels includes a notch at its periphery. In yet another example, one or both of the first body and the second body include a shell structure. In a further example, one or both of the first body and the second body include at least one skid structure coupled to an outer surface thereof.

At 168, a leading pulling device or a trailing pulling device is mounted to a first or second end, respectively, of one or both of: a first or second body and the breaking assembly housing. This may be accomplished in a number of ways. In one example, the leading or trailing pulling device is detachably coupled to the breaking assembly housing bolts and nuts. In another example, the leading or trailing pulling device is detachably coupled to the breaking assembly housing bolts and cotter pins. In another example, the leading or trailing pulling device is permanently coupled to the breaking assembly housing. In varying examples, a size and shape of the leading or trailing pulling device relates to the size of the body used (e.g., the larger the body, the larger the pulling device). In many examples, the leading pulling device includes a bore to which a cable can be releasably engaged to pull the apparatus through the existing underground pipe. In many examples, the trailing pulling device includes a bore to simultaneously pull a replacement pipe into place as the cable pulls the leading pulling device.

The present devices, apparatuses, and methods, as described above and as defined in the appended claims, provide a number of advantages. One advantage is the replacement of existing underground pipes requiring minimal excavation. Other advantages include the following. The use of a plurality of cutting or scoring wheels increasing in an amount each wheel protrudes out of a breaking assembly housing from a first end to a second end of one embodiment of the present apparatus allows for a clean, progressive cut of an existing pipe that provides consistency in the split of the pipe, and reduces pulling force required in the splitting operation. Another advantage includes cost savings through the use of interchangeable bodies (e.g., shells) of varying sizes and an adaptive breaking assembly (e.g., adapted to be used with the plurality of body sizes). Another advantage includes the use of skid structures, which are inexpensive to manufacture and help to reduce friction with the existing underground pipe during a splitting or bursting operation. Yet another advantage includes the use of cutting or scoring wheels having one or more notches at their periphery. Such notches may provide for better wheel rotation, less drag, or increased cutting ability as one embodiment of the present apparatus is pulled through the existing underground pipe. A further advantage provided by the designs disclosed herein is the ability to split corrugated steel pipe that previously was not splittable by trenchless methods. While a number of advantages of the present devices, apparatuses, and methods are herein described, the above list is not intended to be exhaustive in any way.

As mentioned above, this Detailed Description is not to be taken in a limiting sense, and the scope of various embodiments is defined only by the appended claims, along with the full range of legal equivalents to which such claims are entitled.

In the appended claims, the terms "including" and "in which," if used, are intended to mean the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for the trenchless replacement of an existing underground pipe, the apparatus comprising:
    a body, including a pair of body portions including a receiving portion therebetween; and
    a breaking assembly, adapted to be inserted within the receiving portion and detachably coupled to each of the body portions of the body,
    wherein the body and the breaking assembly are adapted, when coupled, to break the existing underground pipe when pulled therethrough.

2. The apparatus as recited in claim 1, wherein the breaking assembly is adapted to be inserted within the receiving portion of and detachably coupled to a plurality of differently-sized bodies.

3. The apparatus as recited in claim 1, wherein the breaking assembly includes one or more cutting wheels, and
    wherein each cutting wheel is adapted to rotate relative to a breaking assembly housing.

4. The apparatus as recited in claim 3, wherein the breaking assembly includes more than one cutting wheel, and wherein each cutting wheel radially protrudes out of the breaking assembly housing an increasing amount along a longitudinal length of the breaking assembly housing.

5. The apparatus as recited in claim 3, wherein each cutting wheel is adapted to eccentrically mount to the breaking assembly housing at one or more positions, wherein each of the cutting wheels protrudes from the breaking assembly housing a different distance in each of the positions.

6. The apparatus as recited in claim 3, wherein the breaking assembly includes a scoring wheel, and
    wherein the scoring wheel is positioned to score an inner surface of the existing underground pipe in advance of the one or more cutting wheels.

7. The apparatus as recited in claim 1, wherein the breaking assembly includes one or more cutting wheels, and
    wherein at least one of the cutting wheels includes a notch at its periphery.

8. The apparatus as recited in claim 7, wherein the body and the breaking assembly are adapted, when coupled, to break corrugated steel pipe when pulled therethrough.

9. The apparatus as recited in claim 1, further comprising:
    a leading pulling device, coupled to a first end of one or both of: the body and the breaking assembly; and
    a trailing pulling device, coupled to a second end of one or both of: the body and the breaking assembly.

10. The apparatus as recited in claim 9, further comprising a cross bar, coupled to the leading pulling device on a cross bar first end and coupled to the trailing pulling device on a cross bar second end.

11. The apparatus as recited in claim 9, wherein the leading pulling device is adapted to be pulled from an apparatus center.

12. The apparatus as recited in claim 9, wherein a size of the leading pulling device and a size of the trailing pulling device relate to a size of the body.

13. The apparatus as recited in claim 1, wherein the body portions include substantially hollow shell structures, and
    wherein each of the shell structures includes at least one internal support member.

14. The apparatus as recited in claim 13, wherein the shell structures are adapted to receive, and detachably couple to, the breaking assembly.

15. The apparatus as recited in claim 1, further comprising at least one skid structure,
    wherein each skid structure is coupled to an outer surface of the body.

16. An apparatus for breaking an existing underground pipe, the apparatus comprising:
    a body including a pair of substantially hollow shells, including a receiving portion;
    a breaking assembly, adapted to be inserted within the receiving portion and detachably coupled to the shells of the body;
    a leading pulling device, coupled to a first end of one or both of: the body and the breaking assembly; and
    a trailing pulling device, coupled to a second end of one or both of: the body and the breaking assembly,
    wherein the breaking assembly includes one or more breaking elements protruding out of a breaking assembly housing.

17. The apparatus as recited in claim 16, further comprising at least one skid structure,
    wherein each skid structure is coupled to an outer surface of the body.

18. The apparatus as recited in claim 16, wherein the one or more breaking elements include a plurality of cutting wheels protruding radially outward from the breaking assembly housing.

19. The apparatus as recited in claim 18, wherein each cutting wheel of the plurality of cutting wheels is adapted to protrude out of the breaking assembly housing an increasing amount along a longitudinal length of the breaking assembly housing.

20. The apparatus as recited in claim 16, wherein the one or more breaking elements include a fin.

21. An assembly for use in an apparatus for the trenchless replacement of an existing underground pipe, the assembly comprising:
    a breaking assembly housing, adapted to detachably couple to the apparatus; and
    one or more cutting wheels, each cutting wheel adapted to rotate relative to the breaking assembly housing, each cutting wheel adapted to eccentrically mount to the breaking assembly housing at one or more positions, wherein each of the cutting wheels protrudes from the breaking assembly housing a different distance in each of the positions;
    wherein the one or more cutting wheels are aligned along substantially one line of cut.

22. The assembly as recited in claim 21, wherein the assembly includes more than one cutting wheel, and wherein each cutting wheel is adapted to radially protrude out of the breaking assembly housing an increasing amount along a longitudinal length of the breaking assembly housing.

23. The assembly as recited in claim 21, wherein at least one of the one or more cutting wheels includes a notch at its periphery.

24. The assembly as recited in claim 21, further comprising a scoring wheel, adapted to score an inner surface of the existing underground pipe in advance of the one or more cutting wheels.

25. A device for use in an apparatus for the trenchless replacement of an existing underground pipe, the device comprising:
- a body, including a pair of similar, semicylindrically-shaped body portions and a receiving portion adapted to detachably couple to a breaking assembly, wherein the body portions each include an internal support member disposed along an interior surface of each body portion; and
- at least one skid structure, coupled to an outer surface of the body,
- wherein the body is adapted to detachably couple to the apparatus.

26. The device as recited in claim 25, wherein the body portions include substantially hollow shell structures.

27. A method for replacing existing underground pipes of various diameters, the method comprising:
- mounting an interchangeable breaking assembly to a first body having a first body diameter;
- detaching the interchangeable breaking assembly from the first body; and
- mounting the interchangeable breaking assembly to a second body having a second body diameter different than the first body diameter,
- wherein mounting the interchangeable breaking assembly to the first body includes detachably coupling the interchangeable breaking assembly to the first body, and
- wherein mounting the interchangeable breaking assembly to the second body includes detachably coupling the interchangeable breaking assembly to the second body.

28. The method as recited in claim 27, wherein one or both of: the first body and the second body include a shell structure.

29. The method as recited in claim 27, wherein the interchangeable breaking assembly includes one or more cutting wheels, and
- wherein each cutting wheel is adapted to rotate relative to a breaking assembly housing.

30. The method as recited in claim 29, wherein each cutting wheel is adapted to eccentrically mount to the breaking assembly housing at one or more positions.

31. The method as recited in claim 29, wherein at least one of the one or more cutting wheels includes a notch at its periphery.

32. The method as recited in claim 27, wherein one or both of the first body and the second body include at least one skid structure coupled to an outer surface thereof.

33. The method as recited in claim 27, further comprising coupling a leading pulling device to a first end of one or both of: the first or second body and the interchangeable breaking assembly.

34. The method as recited in claim 27, further comprising coupling a trailing pulling device to a second end of one or both of: the first or second body and the interchangeable breaking assembly.

* * * * *